July 20, 1943.　　　W. MEYER　　　2,324,792
HOSE COUPLING
Filed April 21, 1942　　　2 Sheets-Sheet 1
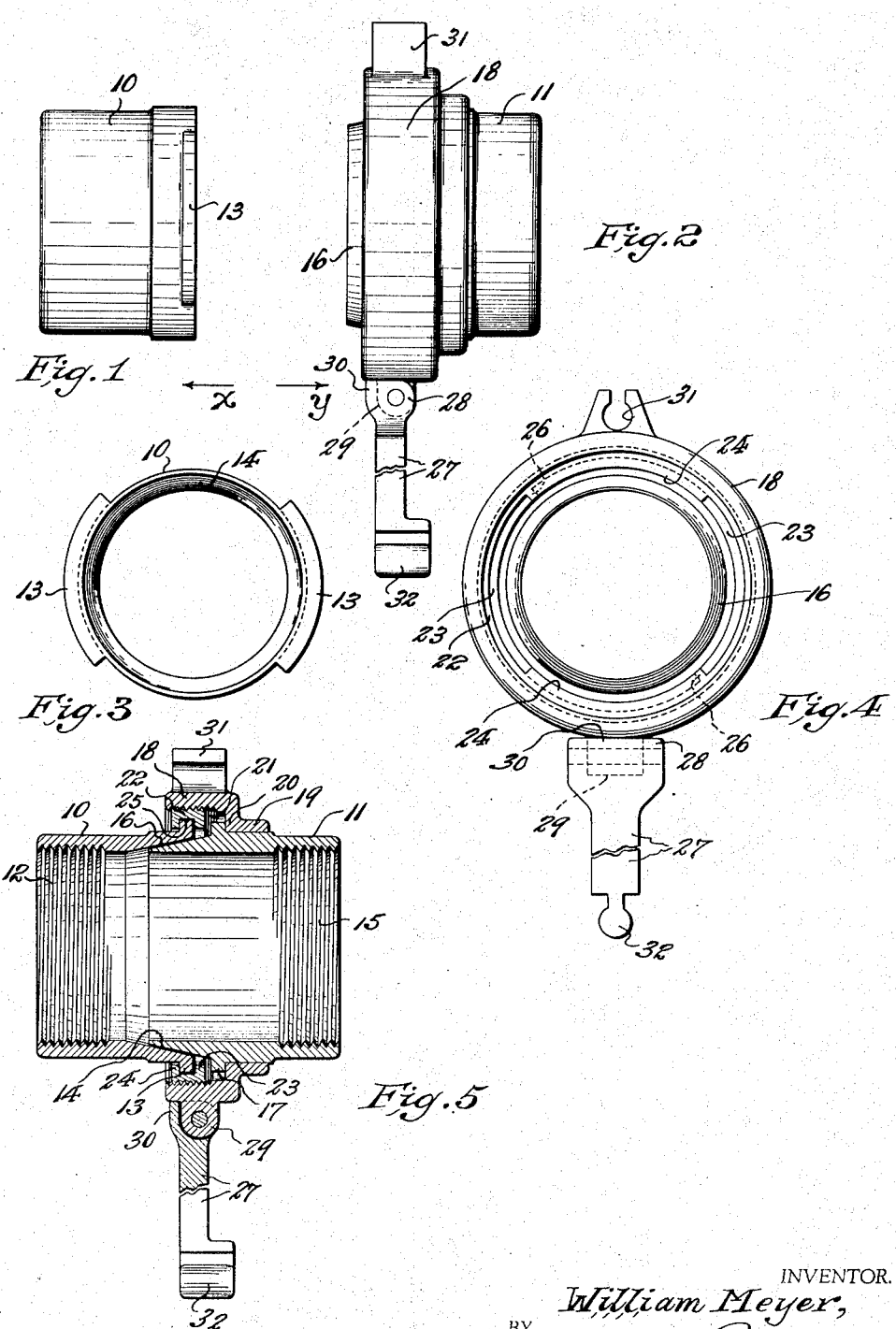
INVENTOR.
William Meyer,
BY George D. Richards,
ATTORNEY.

July 20, 1943.    W. MEYER    2,324,792
HOSE COUPLING
Filed April 21, 1942    2 Sheets-Sheet 2

INVENTOR.
William Meyer,
BY George D. Richards,
ATTORNEY.

Patented July 20, 1943

2,324,792

UNITED STATES PATENT OFFICE 2,324,792

HOSE COUPLING

William Meyer, East Orange, N. J., assignor to A. W. Wheaton Brass Works, Newark, N. J., a corporation of New Jersey Application April 21, 1942, Serial No. 439,841

6 Claims. (Cl. 285—127)

This invention relates to improvements in hose-couplings, and the invention has reference, more particularly, to a novel construction of quick acting hose-coupling for general use, but one especially well adapted for coupling hose sections used to convey viscous fluids, such, e. g., as hot asphalt or other bituminous products.

The invention has for an object to provide a hose-coupling structure comprising male and female members respectively provided with co-operative conical bell and spigot joint portions which obviate necessity for utilizing sealing gaskets; the spigot joint portion of the female member being disposed to project beyond the surrounding elements of said female member which cooperate with those of the male member in interlocking the male and female members together when joined, whereby, when the said members are separated, said interlocking elements of the female member are protected against contact by any draining viscous fluid which might otherwise flow onto the same so as to accumulate and cake thereon to the impairment of their operation, unless subjected to time and labor consuming cleansing operations, which latter requirement is therefore avoided.

The invention has for another object to provide a novel construction of interlocking means for cooperatively securing the male and female members of the coupling in operative joined relation, comprising means for first loosely interengaging the male and female members and then forcing home, one against the other, said bell and spigot joint portions of said members, both in tightly set up relation and securely held against loosening or separation.

The invention has for another object to provide the coupling structure with self-contained means for manipulating the same for setting up and securing the members thereof in tightly joined relation; said means including auxiliary or reserve means for the same purpose useful in the event the primary means is accidentally broken away.

The invention has for a further object to provide auxiliary means for capping and closing the male member of the coupling structure, when the same is separated from the female member.

Other objects of this invention, not at this time more particularly enumerated, will be understood from the following detailed description of the same.

An illustrative embodiment of this invention is shown in the accompanying drawings, in which—

Fig. 1 is a side elevation of the male member of the coupling structure according to this invention, and Fig. 2 is a side elevation of the female member thereof.

Fig. 3 is an elevational view of the coupling end of the male member, viewed in the direction of the arrow X in Fig. 1, and Fig. 4 is an elevational view of the coupling end of the female member of the coupling structure, viewed in the direction of the arrow Y in Fig. 2.

Fig. 5 is a longitudinal sectional view of the male and female members of the coupling structure as initially coupled prior to being tightly closed and secured together.

Similar characters of reference are employed in the above described views, to indicate corresponding parts.

Figure 6:
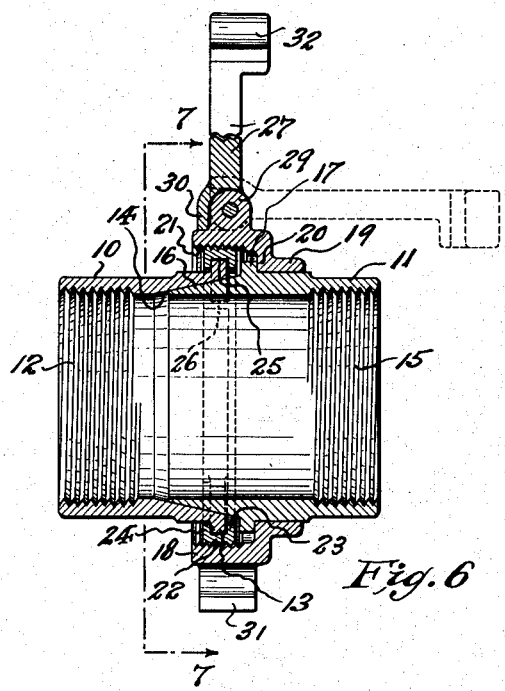
Fig. 6 is a similar view showing said members as finally tightly closed and secured together.

The coupling structure according to this invention comprises a male member 10 and a female member 11.

The male member 10 comprises a cylindrical tubular body, internally screw threaded at its rearward end portion, as at 12, whereby to receive engagement of a standard nipple (not shown) for connecting a hose section thereto. At its forward end, said male member 10 is provided with circumferentially spaced, laterally projecting interlock lugs 13. As illustratively shown, there are two such lugs 13, diametrically aligned to project from opposite sides of male member body; it will be understood, however, that more than two such lugs may be optionally provided. Formed interiorly within the forward end portion of said male member 10 is a conical bell joint portion 14.

The female member 11 comprises a cylindrical tubular body, internally screw-threaded at its rearward end portion, as at 15, whereby to receive engagement of a standard nipple (not shown) for connecting a hose section thereto. At its forward end, said female member 11 is provided with a forwardly projecting conical spigot joint portion 16, sized to fit closely into the conical bell joint portion 14 of the male member, when said male and female members are operatively coupled together. Rearwardly of said spigot joint member 16, the female member 11 is provided with an external annular keeper flange or shoulder 17. Rotatively mounted on the female member 11 is an annular locking collar 18 which is open at its forward side or end. At its rearward side or end, said locking collar 18 is provided with a bearing neck portion 19 of reduced diameter, the same being connected to said locking collar 18 by an inwardly offsetting shoulder portion 20. Said bearing neck portion 19 is journaled upon the female member 11 behind the keeper flange or shoulder 17 of the latter, so as to turn freely thereon, but so as to be stopped against forward axial movement by the abutment of the shoulder portion 20 thereof against said keeper flange or shoulder 17. The internal diameter of said locking collar 18 substantially exceeds the external diameter of said female member 11, thus providing an intermediate forwardly open annular chamber, and said locking collar chamber is provided with internal screw-threads 21. Said locking collar 18 overhangs the spigot joint portion 16 of the female member, but is of less width than the length of the latter, so that the free end of said spigot joint portion 16 projects through and well beyond the open forward side or end of said locking collar, for purposes later herein to be set forth. Threaded into said internally screw-threaded portion of said locking collar 18 is a locking ring 22. This locking ring 22 is provided, at its rearward side, with a continuous inwardly projecting annular stop flange 23, and at its forward side with circumferentially spaced, inwardly projecting interlock lugs 24, corresponding in number to the heretofore described interlock lugs 13 of the male member 10. Said interlock lugs 24 are forwardly spaced from the stop flange 23 to provide an annular receiving channel 25 within the locking ring 22, for reception of the male member interlock lugs 13, when the male and female members are operatively connected together. Bridging said receiving channel 25 at certain ends of the interlock lugs 24 are stop elements 26. Said locking ring 22 is disposed forwardly of the keeper flange or shoulder 17, against which it may be stopped to prevent rearward displacement or separation of the locking collar 18 from its assembled relation to the female member 11. In normal initial position, the locking ring 22 is moved and lies toward the outer open end of said locking collar 18.

When coupling the male and female members 10—11 together, the male member 10 is turned to oppose its interlock lugs 13 to the spaces between the interlock lugs 24 of the locking ring 22 of the female member, whereupon the male member is moved axially toward the female member, so as to carry said interlock lugs 13 into the receiving channel 25 of said locking ring, and thus lodged in a plane behind the interlock lugs 24 of the latter; such inward axial movement of the male member being limited by the continuous stop flange 23 of said locking ring. When the interlock lugs 13 of the male member are thus entered in the locking ring 22, the male member is turned about its longitudinal axis so as to carry the interlock lugs 13 behind the interlock lugs 24 of the locking ring, and until stopped against the stop elements 26 with which the latter is provided.

Figure 7:
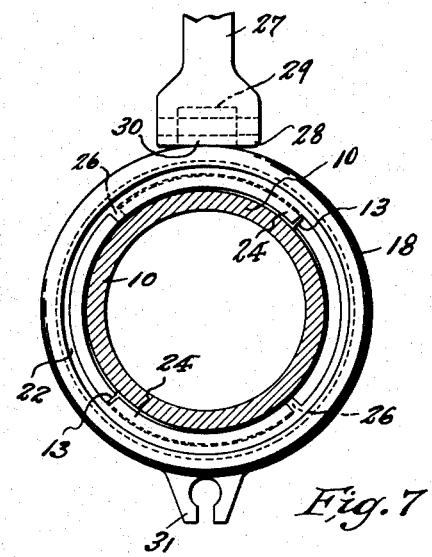
Fig. 7 is a transverse sectional view, taken on line 7—7 in Fig. 6.
Figure 8:
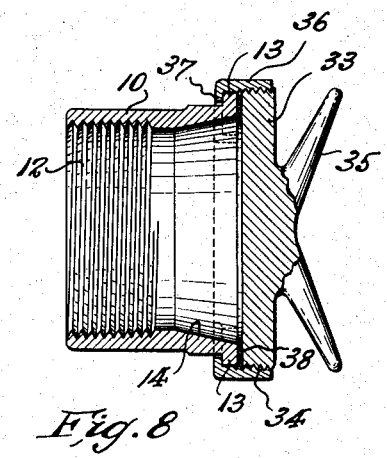
Fig. 8 is a longitudinal sectional view of the male member of the coupling structure, detached from the female member thereof, and capped by the applied auxiliary closure means provided therefor.
Figure 9:
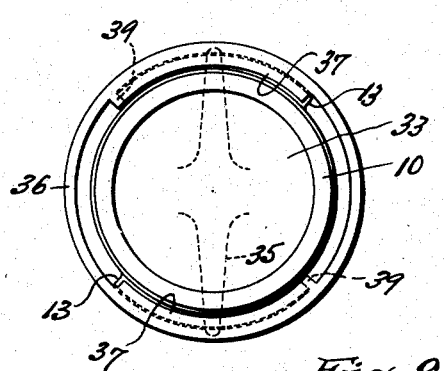
Fig. 9 is an end elevation of the same, viewed from left to right in Fig. 8.

When the preliminary coupling operations above described are completed, the spigot joint portion 16 of the female member 11 will be loosely entered in the bell joint portion 14 of the male member 10 (see Fig. 5). To force the thus initially engaged bell and spigot joint portions 16—14 together in tightly set up or joint closing relation, the locking collar 18 is turned on and about the female member 11 in a direction operative to cause its internal screw-threads 21 to thrust inwardly upon the locking ring 22, whereby to move the same axially inward; said locking ring 22 being, under such action, stopped against rotation by reason of the abutment of its stop elements 26 against ends of the male member interlock lugs 13 (see Fig. 7). The inward bodily movement thus imparted to the locking ring 22 causes its interlock lugs 24 to thrust inwardly against the interlock lugs 13 of the male member 10, thereby moving inwardly the latter so as to tightly set up the bell joint portion 14 in joint closing relation to the spigot joint portion 16 of the female member 11 (see Fig. 6). When the bell and spigot joint portions 14—16 are thus tightly engaged and set up, the inward movement of the locking ring 22 will be arrested, and consequently by turning the locking collar 18 forcibly and tightly home on the stationary locking ring 22, a jamb-nut effect is obtained which is adequate to securely hold the locking collar 18 against accidental backing off, so that the operatively joined male and female members are consequently likewise securely retained against accidental loosening or separation.

Self-contained means are provided for rotatively manipulating the locking collar 18, the same comprising a radial hand lever 27, the bifurcate inner end 28 of which is pivotally connected to a hinging knuckle 29 which projects from the external periphery of said locking collar 18. Preferably the bifurcate hinged end portion of the hand lever 27 is provided with a transverse stop portion 30 on its outer side, whereby to limit the outward swing of said hand lever 27 to operative radially extending position (shown by solid lines in Fig. 6). It will be noted, that, owing to its hinged connection with the locking collar 18, said hand lever 27 may be swung down parallel to the female member 11 when not in use (see dotted line representation thereof in Fig. 6), thus permitting the hose section which is equipped with the female coupling member to be inserted in a housing tube when not in use.

It may possibly occur, incident to rough handling of the coupling in the field, that the locking collar manipulating hand lever 27 is broken off. To permit use of the hand lever, even should this occur, auxiliary means are provided for operatively engaging the same with the locking collar 18 in a manner to permit application thereby of turning force to the latter. To this end a female socket lug 31 is provided to extend from another part of the periphery of the locking collar 18, and the free end portion of the hand lever 27 is provided with a male plug or crosshead 32 conformably shaped to operatively engage in the socket of the lug 31 so as to temporarily join the hand lever in operative affixed or interlocked relation to the locking collar.

It will be understood that to uncouple the operatively joined male and female members, the locking collar 18 is reversely turned on the female member, whereby its threaded connection with the locking ring 22 will back out the latter, thus relaxing the inward thrust of its interlock lugs 24 upon the interlock lugs 13 of the male member. Upon such occurrence, the male member may be turned to register its interlock lugs 13 with the spaces intermediate the interlock lugs 24, so that thereupon the male member may be outwardly withdrawn and separated from the female member.

It has been above pointed out that the spigot joint portion 16 of the female member projects outwardly of and beyond the locking collar 18 and its contained locking ring 22. This is highly desirable, since upon separation of the female member from the male member any draining of viscous fluid through the former is carried by the outwardly projecting free end of the spigot joint portion 16 beyond and away from any possible entrance into the interior of the locking collar and locking ring. The latter parts are therefore adequately protected against becoming jammed or obstructed by accumulation and caking therein of the fluid served through the coupling.

It is desirable to protect the interior of the male member and its bell joint portion 14, when disengaged from the female member 11, against entrance thereinto of foreign substances, and against injury to its externally projecting interlock lugs 13. To this end, a detachable capping or closure means is provided in a form adapted to cooperate with the interlock lugs 13 for securing the same in attached, closing relation to said male member 10. Said capping or closure means comprises a closure plate or disc 33 having a screw-threaded periphery 34, and provided on its exterior face with suitable hand grip means 35. A locking ring 36 is provided, the same having a rearwardly open end which is internally screw-threaded to screw onto the screw-threaded periphery of said closure plate or disc 33. At its forward end said locking ring 36 is provided with circumferentially spaced, inwardly projecting interlock lugs 37, corresponding in number to that of the interlock lugs 13 of the male member. Carried on the inner face of said closure plate or disc 33, if desired, is a sealing gasket 38 engageable by the extremity of the male member 10.

To attach the capping or closure means to the male member 10, the spaces between the interlock lugs 37 of the locking ring 36 are opposed to the interlock lugs 13 of the male member, whereby the latter may enter the locking ring 36 to lie in a plane behind its interlock lugs 37, whereupon to be turned until stopped by stop elements 39 and lodged back of the latter. When the parts are thus initially assembled and engaged, the closure plate or disc 33 is turned in a direction operative to cause its screw-threaded periphery 34 to move the locking ring 36 so that the interlock lugs 37 will thrust inwardly upon the interlock lugs 13 of the male member, thereby forcing the extremity of the latter tightly home against the closure plate or disc and its gasket 38. A reversal of these operations will loosen the capping or closure means for removal form the male member.

Having now described my invention, I claim:

1. A hose coupling or the like comprising a female member having a spigot joint portion, a forwardly open locking collar rotatable on said female member, a locking ring within said locking collar having a screw-threaded connection therewith, said locking ring having circumferentially spaced internal interlock lugs, said spigot joint portion being disposed to extend forwardly through and outwardly beyond said locking collar and its contained locking ring, a male member having a bell joint portion to receive the spigot joint portion of said female member, and said male member having circumferentially spaced external interlock lugs adapted to be entered in said locking ring and disposed behind the internal interlock lugs thereof, rotation of said locking collar in a given direction being adapted to move said locking ring axially to thereby thrustingly engage its interlock lugs with those of the male member and thus forcibly move said male and female members together to set up their engaged bell and spigot joint portions in tight joint forming relation.

2. A hose coupling as defined in claim 1 wherein said locking collar is provided with a foldable hand lever hingedly connected therewith and movable to a radially projected operative position relative to said locking collar.

3. A hose coupling as defined in claim 1 wherein said locking collar is provided with a foldable hand lever hingedly connected therewith and movable to a radially projected operative position relative to said locking collar, said hand lever having a suitably shaped male plug at its free end, and said locking collar being further provided with a coupling socket means conformable to and adapted to receive said male plug, whereby to operatively couple the hand lever to said locking collar should the former be accidentally broken away from its normal hinged connection with the latter.

4. A hose coupling or the like comprising a female member having a spigot joint portion, a forwardly open locking collar rotatable on said female member, a locking ring within said locking collar having a screw-threaded connection therewith, said locking ring having an internal annular stop flange at its rearward side, said locking ring also having circumferentially spaced internal interlock lugs at its forward side and spaced from said stop flange, said spigot joint portion being disposed to extend forwardly through and outwardly beyond said locking collar and its contained locking ring, a male member having a bell joint portion to receive the spigot joint portion of said female member, said male member having circumferentially spaced external interlock lugs adapted to be entered in said locking ring until stopped by the stop flange thereof and then turned for disposition behind the internal interlock lugs of said locking ring, rotation of said locking collar in a given direction being adapted to move said locking ring axially to thereby thrustingly engage its interlock lugs with those of the male member and thus forcibly move said male and female members together to set up their engaged bell and spigot joint portions in tight joint forming relation, and said locking ring having transverse stop elements intermediate given ends of its interlock lugs and its stop flange to engage ends of the male member interlock lugs whereby to prevent rotation of said locking ring relative to said male member under the forcing thrust of the rotated locking collar.

5. A hose coupling as defined in claim 4 wherein said locking collar is provided with a foldable hand lever hingedly connected therewith and movable to a radially projected operative position relative to said locking collar.

6. A hose coupling as defined in claim 4 wherein said locking collar is provided with a foldable hand lever hingedly connected therewith and movable to a radially projected operative position relative to said locking collar, said hand lever having a suitably shaped male plug at its free end, and said locking collar being further provided with a coupling socket means conformable to and adapted to receive said male plug, whereby to operatively couple the hand lever to said locking collar should the former be accidentally broken away from its normal hinged connection with the latter.

WILLIAM MEYER.